June 9, 1953  L. C. PARKER  2,641,544
METHOD FOR FLAVORING MEAT PRODUCTS
Filed May 9, 1950
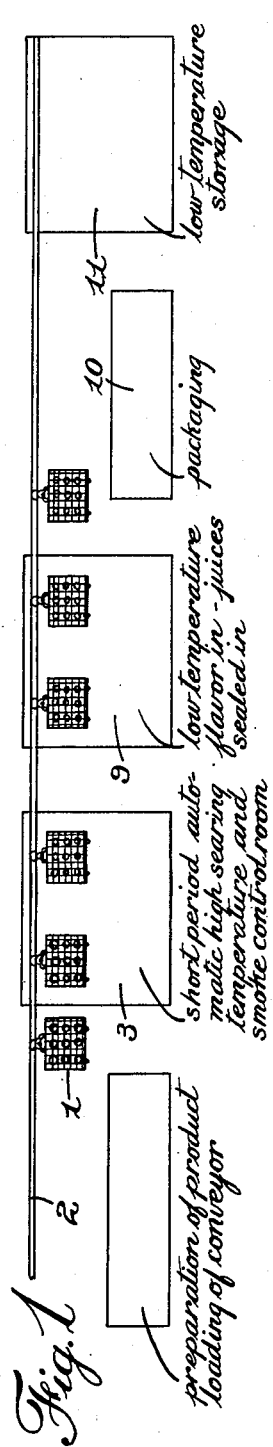
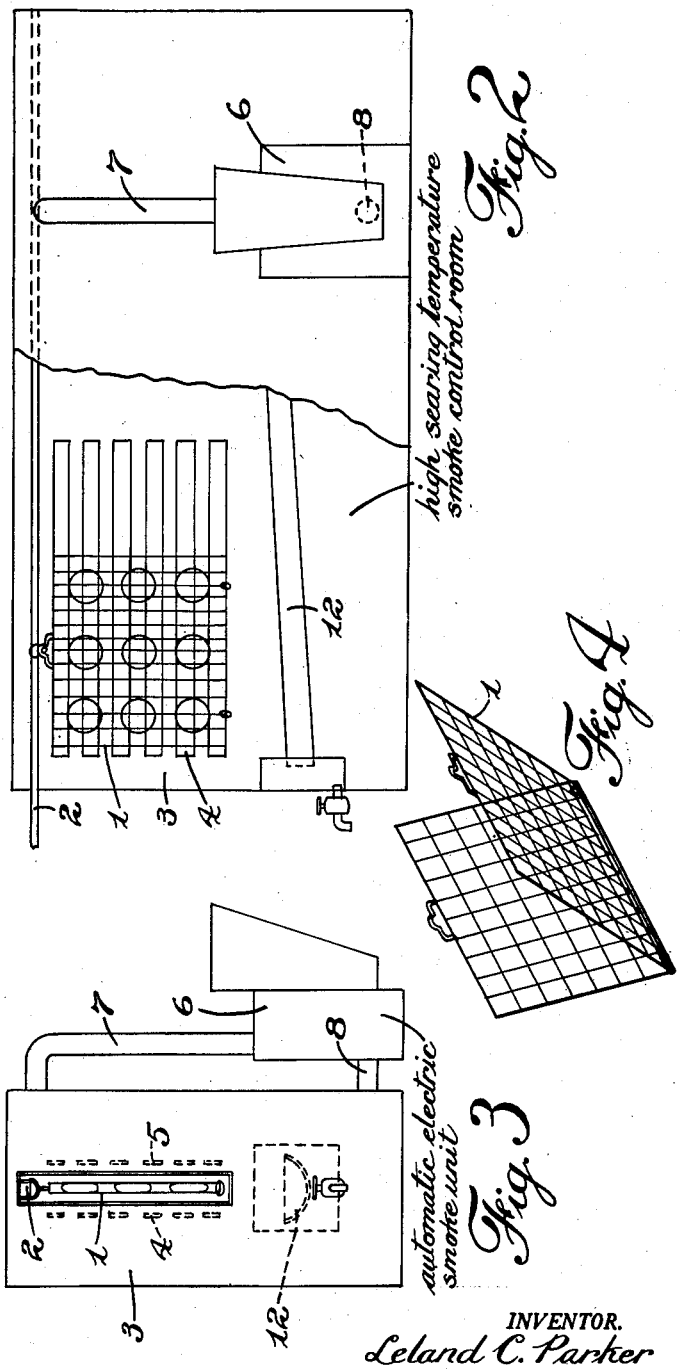
INVENTOR.
Leland C. Parker
BY
Clinton S. Janes
ATTORNEY Patented June 9, 1953

2,641,544

UNITED STATES PATENT OFFICE 2,641,544

METHOD FOR FLAVORING MEAT PRODUCTS

Leland C. Parker, Elmira, N. Y.

Application May 9, 1950, Serial No. 160,975

3 Claims. (Cl. 99—107)

The present invention relates to a method and apparatus for preparing meat products, poultry or fish; and more particularly for incorporating flavoring and aromatic material in and near the surfaces of meat products such as steaks, ground meat patties, etc.

It is well known that meats which are broiled over a fire of aromatic fuel such as hickory wood absorb a certain amount of flavor and aroma from the burning fuel which enhance and supplement the natural flavor of the meat. It is also well known, of course, that meats may be preserved and flavored by long exposure in a warm smoky atmosphere whereby the products of partial combustion penetrate gradually throughout the meat and thereby effect the desired results.

Applicant has discovered that it is possible to impart a desired flavor to meat by drawing the juices of the meat to the surface by a brief exposure to intense heat, impregnating the juices with the desired flavor; and then sealing in the flavor by quickly freezing the meat, so that the body of the meat remains in its raw, fresh state.

It is an object of the present invention to provide a novel method for imparting flavor superficially to raw meat products such as fillets or patties, and sealing in the flavor while leaving the interior of the meat in its fresh, uncooked state.

It is another object to provide such a method which may readily be carried out as a continuous process.

It is another object to provide a novel apparatus for efficiently carrying out the stated process.

Further objects and advantages will be apparent from the following description taken in connection with the accompanying drawing, in which Fig. 1 illustrates diagrammatically a suitable form of apparatus for carrying out the inventive process;

Fig. 2 is a side elevation, partly broken away, of the flavor-impregnating chamber and generator;

Fig. 3 is front end elevation of the flavor-impregnating chamber; and

Fig. 4 is a detail in perspective of a rack for conveying the meat through the processing apparatus.

In carrying out the present method, the meat product is first prepared in the desired physical shape such as patties or slices of suitable dimensions, placed in racks or grills 1, such as shown in Fig. 4, and then hung on a conveyor track 2, as shown in Fig. 1.

The loaded racks are moved along the track 2 by any suitable means into a chamber 3 where they pass between grids 4 and 5 (Fig. 3) which are heated to a searing temperature, preferably by the passage of electrical current therethrough. The heat from the grids rapidly raises the temperature of the surfaces of the meat so as to draw out the juices underlying the surface and cause said warmed juices to cover the exposed surfaces.

The atmosphere in the chamber 3 is heavily charged with an aromatic flavoring material which is absorbed by the warm juice of the meat as the racks traverse the chamber. As here shown, this is accomplished by providing a smoke generator 6 adjacent the chamber 3, and arranging to circulate the volatile products of partial combustion of a fuel, such as hickory wood or sawdust, through said chamber by means of pipe connections 7 and 8. A dense smoke-laden atmosphere is thereby maintained in the chamber 3 so as to quickly saturate the superficial layer of hot juices covering the meat.

The rate of passage of the meat through the impregnating chamber 3 is so coordinated with the temperature of the heated grids 4 and 5 that the exudation of the juices and the impregnation thereof by the aromatic smoke is accomplished so rapidly that the high temperature does not penetrate substantially below the surface of the meat so that the body of the meat remains in its fresh, raw state.

Immediately upon emerging from the impregnating chamber 3, the racks of meat pass into a quick freezing chamber 9 where the smoke-saturated juices are largely reabsorbed into the surfaces of the meat and immediately congealed so as to seal the flavoring material in the meat close to the surfaces thereof. The racks of frozen meat then emerge into a packaging station 10 where the meat is unloaded and assembled in suitable cartons or other packages which are thereupon placed in low-temperature storage chamber 11 where it is held for shipment and delivery by refrigerated carriers.

The impregnating chamber 3 is preferably provided with a drip tray 12 for collecting any excess juice which does not adhere to the meat. Inasmuch as the juice so collected is saturated with the flavoring material, it has been found to be highly useful in imparting the flavor to untreated meats and/or gravies.

It will be understood that when the word "meat" is used in the specification and claims, it is intended to include both fish and poultry products by this term. Moreover exposure times and temperatures of the heating grids may be varied and changes may be made in the precise structure shown, without departing from the spirit of the invention.

What is claimed:

1. A process for producing a flavoring coating on patties of fresh meat comprising the steps of drawing the juices of the meat to the surface of the pattie by exposure to a searing temperature, simultaneously impregnating the hot adherent juices with an aromatic flavoring material, and then immediately sealing the flavor in the juices and forming an adherent preservative envelope for the fresh meat by quickly congealing the juices by cooling the meat to a preserving temperature.

2. A process for flavoring meat as set forth in claim 1, in which the exposure of the meat to the searing temperature is so brief that the body of meat remains in its fresh, raw state.

3. A process for imparting a superficial adherent coating of aromatic flavor to fillets of fresh meat including the steps of drawing the juices from the superficial pores of the meat by brief exposure of the surfaces to intense radiant heat, impregnating the juices so evoked with an aromatic flavoring material, and then causing the partial reabsorption of the juices and congelation thereof into an impervious coating to seal the flavor in the meat and preserve its fresh raw state by quickly cooling the meat to a preserving temperature.

LELAND C. PARKER.

References Cited in the file of this patent

UNITED STATES PATENTS

| Number | Name | Date |
|---|---|---|
| 1,667,574 | Turner | Apr. 24, 1928 |
| 1,965,960 | Laubham | July 10, 1934 |
| 2,078,639 | Rohrmann | Apr. 27, 1937 |
| 2,140,163 | McKee | Dec. 13, 1938 |
| 2,199,584 | Bemis | May 7, 1940 |
| 2,342,373 | Schiewe | Feb. 22, 1944 |
| 2,464,614 | Sala | Mar. 15, 1949 |
| 2,506,908 | Thompson | May 9, 1950 |
| 2,507,486 | Weissenbach | May 9, 1950 |